March 7, 1944.          L. V. GOFF          2,343,662
ATTACHABLE WHEEL FOR SLEDS
Filed Dec. 31, 1941
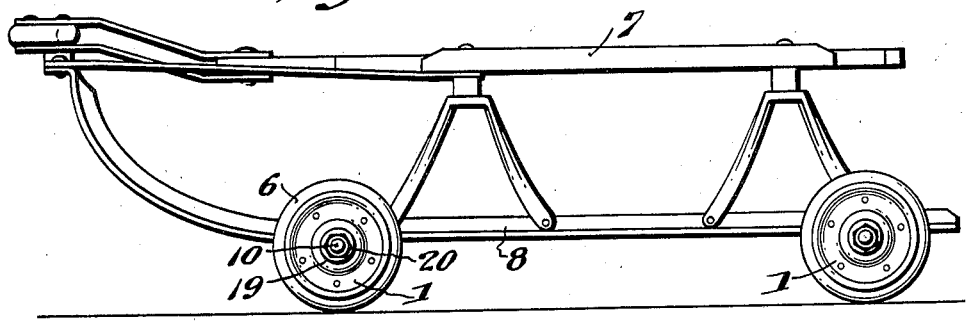
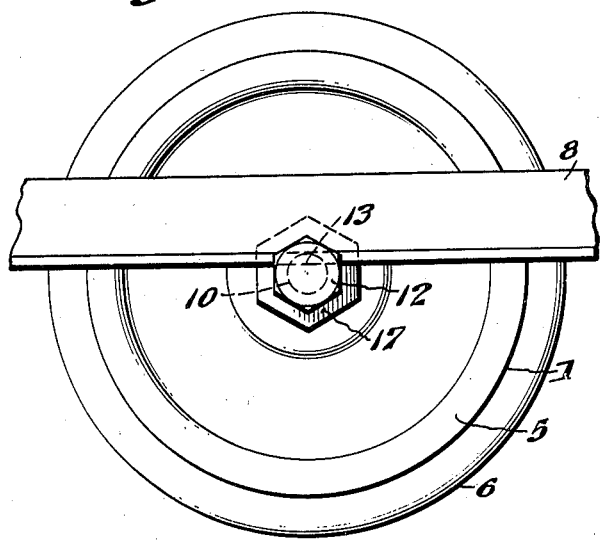
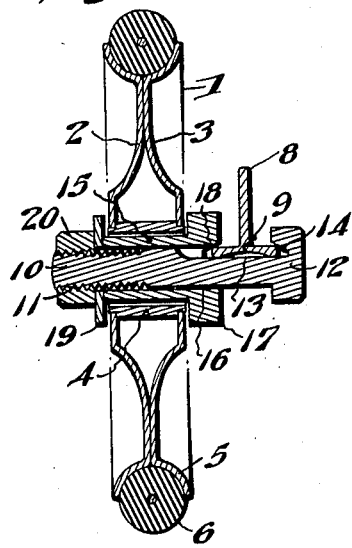
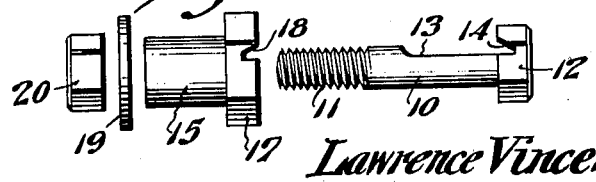
Inventor
Lawrence Vincent Goff
By Lloyd W. Patch
Attorney Patented Mar. 7, 1944

2,343,662

UNITED STATES PATENT OFFICE 2,343,662

ATTACHABLE WHEEL FOR SLEDS

Lawrence Vincent Goff, Canton, Ohio

Application December 31, 1941, Serial No. 425,221

6 Claims. (Cl. 280—8)

My invention relates to attachable wheels for sleds, and particularly to wheel structure intended and adapted to be detachably applied to the gliding runners of a child's sled, whereby an ordinary sled can be converted to be used as a wheeled conveyance for use when and under circumstances where snow and ice are not available.

An object of my invention is to provide wheel attaching and mounting means that can be readily and conveniently attached to and detached from the gliding runners of various sizes and constructions of present day types of sleds, without necessity of having or employing special tools or equipment, and without specialized skill or knowledge, the construction being such that a child can apply and remove the wheels with simple tools or equipment usually available in any household.

Another object is to provide wheel and mounting structure and attaching portions of simple and inexpensive construction that can be manufactured without employment of unusual or special machines or equipment, and which can consequently be made available and can be marketed to the user at a low price to thus be available to purchasers of moderate income and to thus make possible conversion of a sled into a wheeled coast vehicle at a moderate expenditure.

With the above and other objects in view, some of which will be apparent to those skilled in the art and others of which are inherent in the assembly and use of the structure, my invention includes certain novel features of construction and combinations and arrangements of parts which will be hereinafter set forth in connection with the drawing and then pointed out in the claims.

In the drawing:

Figure 1 is a view in side elevation showing a sled having my invention applied thereto.

Fig. 2 is a fragmentary view looking from the inside of the runner and showing my invention applied.

Fig. 3 is an axial vertical sectional view.

Fig. 4 is a group elevational view showing the mounting parts.

The wheel, generally indicated at 1, is here shown as being of the disc type with the side members 2 and 3 connected by a tubing spacer hub 4. The wheel is provided with an outer peripheral groove 5 in which a rubber tire 6 is mounted.

In the present instance, I have shown the sled 7 as being of usual and ordinary construction, and the gliding runners 8 thereof are of usual form, being substantially T-shaped in cross section, as best shown in Fig. 3. Children's sleds as now made are ordinarily provided with runners of substantially T-shaped form in which the head flange has its outer face presented as the gliding face of the runner, and in some instances these gliding faces are grooved, as indicated at 9. While practically all sleds are now made with runners of this general T-shaped configuration in cross section, the width of the head flange and the thickness may vary in different sizes and makes of sleds, and the mounting means of the present invention contemplates accommodation of an adjustment to substantially all sizes of sled runners.

The mounting bolt 10 has the usual substantially cylindrical shank externally screw threaded at one end, as at 11, and provided with a head 12 at the opposite end. On one side the cylindrical shank of the bolt is cut or milled away, or is otherwise flattened, as at 13, and the flattened portion is extended into the inner face of the head 12 as a substantially V-shaped groove 14 extending transversely across the inner face of the head 12. The flattened face 13 is adapted to receive and bear against the tread face of the runner 8, and the substantially V-shaped cross slot or recess 14 is adapted to engage over and wedge upon the inner edge of the head flange of the runner. A bearing sleeve 15 has a bore opening 16 slidably receiving the threaded end 11 of the bolt 10, and this bearing sleeve 15 is made with an external diameter to be received in and to revolubly mount the hub 4 and consequently the wheel. The bearing sleeve 15 has a head 17 at its inner end, and the bearing portion of this sleeve is preferably made slightly longer than the hub 4. In assembly of the parts, the bearing sleeve 15 will be fitted on the threaded end 11 of the mounting bolt 10, with the outer face of the head 17 opposed to and spaced from the inner face of the head 12. This outer face of the head 17 is provided with a substantially V-shaped groove 18 extending transversely thereacross with the bottom of the groove in substantially the same plane as the flattened face 13. Thus, as the bearing sleeve 15 is moved onto the bolt 10 the groove 18 will engage over and wedge upon the outer edge of the head or tread flange of the runner.

A washer 19 is fitted upon the threaded end 11 of the bolt 10, and a clamp nut 20 is turned onto this threaded portion. With the parts assembled and fitted substantially as shown in Fig. 3, as the clamp nut 20 is tightened or turned onto the threaded portion 11 of the bolt, this nut will bear against washer 19 thus disposing the washer at the outer end of the bearing sleeve 15 to retain the wheel 1 in place, and at the same time pressure exerted upon the bearing sleeve 15 will cause this member to be moved endwise inwardly upon the bolt 10 and will securely clamp the sled runner in place. Since the bearing portion of the bearing sleeve 15 is slightly longer than the hub 4, the wheel 1 is thus mounted for free rotation, and with two wheels applied to each of the runners on each side of the sled a very effective coaster structure is provided. While the binding force of the clamping nut 20 will ordinarily hold the washer 19 against the rotating force of the wheel and consequently prevent loosening of the clamping nut, the washer 19 may be made as a D-washer with the bolt 10 appropriately flattened on one side, as is now common and ordinary practice, and thus the washer would be positively locked against rotation; or, other well known expedients might be resorted to for this purpose.

In the manufacture of the mounting parts, the bolt 10 can be an ordinary bolt with the flattened portion at 13 and the groove at 14 formed therein, or this part can be made up in any other desired and suitable manner. The bearing sleeve 15 can be readily made from hexagonal or other suitable shaped bar stock turned or formed in automatic screw machine operations, or otherwise manufactured, and the washer 19 and the clamp nut 20 are of course readily obtainable. Obviously, the wheel 1 can be of various constructions as desired. Thus, my invention provides attachable wheel structure for sleds that is of simple construction capable of being readily and inexpensively manufactured and consequently that can be sold at a low price placing the complete wheel attachment set within reach of practically any and all purchasers of a sled, with the attachable wheel set thus available at a cost only slightly fractionally more than the purchase price of an ordinary sled. At the same time, the construction of the mounting parts is such that a young child can readily attach and detach the wheels without necessity of employment of special tools or specialized knowledge or skill; and, thus the wheels are attached and will hold rigidly in their mounting upon the sled runners and the wheels will revolve freely without danger of displacement or obstruction or impediment from any part of the sled or mounting.

While I have herein shown and described only certain specific embodiments of my invention and have set forth only certain possible modifications, it will be appreciated that changes and variations can be made in the form, construction, arrangement and assembly, and in the manner of use and attachment, without departing from the spirit and scope of my invention.

I claim:

1. An attachable wheel for sleds comprising a wheel having a bearing opening, a bearing sleeve provided at one end with a transverse groove and having a bearing portion on which the wheel is revolubly mounted, a mounting bolt externally screw threaded at one end and provided with a head at its opposite end having a transverse groove, said bolt being fitted through said bearing sleeve with the groove thereof in opposed relation to the groove of the bearing sleeve, and a clamp nut turned onto the threaded end of said bolt.

2. An attachable wheel for sleds comprising a wheel having a bearing opening, a mounting bolt threaded at one end and provided with a head at the other end, said mounting bolt being flattened on one side and having a transverse groove on the inner side of the head aligned with the flattened side, a bearing sleeve having a portion on which the wheel is rotatably mounted fitted on the threaded end of the bolt and provided on its inner end face with a transverse groove in opposed relation to the groove of the bolt head, and a clamp nut turned onto the threaded end of said mounting bolt.

3. An attachable wheel for sleds comprising a wheel having a bearing opening, a bearing sleeve provided at one end with an enlarged head portion and having a portion on which said wheel is revolubly received, said bearing sleeve on the head end being provided with a transverse groove, a mounting bolt threaded at one end and provided with a head at its opposite end fitted at its threaded end through said bearing sleeve, said bolt being transversely grooved on the inner side of its head, a washer fitted on the threaded end of the bolt and against the outer end of the bearing sleeve, and a clamp nut turned onto the threaded end of the bolt and against said washer.

4. An attachable wheel for sleds comprising a wheel having a bearing opening, a bearing sleeve provided at one end with a head and having a bearing portion on which said wheel is revolubly mounted, a mounting bolt threaded at one end and headed at the other fitted with its threaded end through the bearing sleeve, said mounting bolt being flattened on one side adjacent to the head and being provided on the inner face of the head with a transversely extending groove, said bearing sleeve having on the outer face of the head thereof a transversely extending groove substantially opposed to the groove of the head of the bolt, a washer fitted on the threaded end of said bolt against the end of the bearing sleeve on which the wheel is rotatably mounted, and a clamp nut turned onto the threaded end of said bolt against said washer.

5. An attachable wheel for sleds comprising a wheel having a hub provided with a bearing opening, a bearing sleeve headed at one end and provided with a bearing portion on which said wheel is revolubly mounted, a mounting bolt threaded at one end and headed at its other end having its threaded end fitted through the bearing sleeve thus disposing the head of the bolt in spaced opposed relation with respect to the head of the bearing sleeve, said bolt being flattened on one side adjacent to the head and being provided on the inner face of the head with a transverse substantially V-shaped groove having one side substantially in the plane of the flattened portion of the bolt, said bearing sleeve on the outer face of the head thereof being provided with a transversely extending substantially V-shaped groove having one side substantially in the plane of the flattened portion of the bolt, a washer fitted on the threaded end of the bolt against the end of the bearing portion of the bearing sleeve and extending peripherally therearound, and a clamp nut turned onto the threaded end of the bolt against said washer.

6. An attachable wheel structure for sleds comprising a sled runner of substantially T-shaped form in cross section having the head flange thereof disposed downwardly to provide a gliding tread portion, a wheel having a hub portion provided with a bearing opening, a bearing sleeve having a head at one end and provided with a bearing portion on which said wheel is revolubly mounted, a mounting bolt of greater length than said bearing sleeve threaded at one end and headed at its other end fitted with its threaded end extending through the opening of the bearing sleeve and its headed end spaced from the head portion of said sleeve, said mounting bolt being flattened on one side to fit against the tread portion of the sled runner and having a substantially V-shaped transverse groove on the inner side of the head thereof substantially lining up with the flattened side for reception of one edge of the head flange of the sled runner, said bearing sleeve being provided on the outer face of the head thereof with a transverse substantially V-shaped groove aligning with the flattened side of the bolt for reception of the opposite edge of the head flange of the runner, a washer fitted on the threaded end of said mounting bolt against the outer end of the bearing sleeve and extending peripherally therearound to retain the wheel in place thereon, and a clamp nut turned onto the threaded end of said mounting bolt bearing against said washer and consequently exerting endwise pressure against the bearing sleeve thereby moving said bearing sleeve along the bolt to tighten and clamp the sled runner within the opposed transverse substantially V-shaped grooves of the heads of the bolt and the bearing sleeve.

LAWRENCE VINCENT GOFF.